(12) United States Patent
Yamamoto et al.

(10) Patent No.: US 11,000,841 B2
(45) Date of Patent: May 11, 2021

(54) HONEYCOMB STRUCTURE

(71) Applicant: NGK Insulators, Ltd., Nagoya (JP)

(72) Inventors: Hirotaka Yamamoto, Nagoya (JP);
Tomohiro Ishioka, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 260 days.

(21) Appl. No.: 16/291,386

(22) Filed: Mar. 4, 2019

(65) Prior Publication Data
US 2019/0291091 A1 Sep. 26, 2019

(30) Foreign Application Priority Data
Mar. 23, 2018 (JP) .............................. JP2018-057064

(51) Int. Cl.
*B01J 35/04* (2006.01)
*B01D 53/94* (2006.01)
*B01J 21/12* (2006.01)
*B01J 37/08* (2006.01)
*B01J 23/02* (2006.01)
*B01J 37/00* (2006.01)
*B01J 37/34* (2006.01)
*B01J 21/16* (2006.01)

(52) U.S. Cl.
CPC .............. *B01J 35/04* (2013.01); *B01D 53/94* (2013.01); *B01J 21/12* (2013.01); *B01J 21/16* (2013.01); *B01J 23/02* (2013.01); *B01J 37/0018* (2013.01); *B01J 37/08* (2013.01); *B01J 37/346* (2013.01)

(58) Field of Classification Search
None
See application file for complete search history.

(56) References Cited

U.S. PATENT DOCUMENTS

| 7,981,497 B2 * | 7/2011 | Ichikawa ............ C04B 41/5024 428/116 |
| 2013/0059724 A1 | 3/2013 | Hirose et al. |
| 2015/0267583 A1 | 9/2015 | Brueck et al. |

FOREIGN PATENT DOCUMENTS

| DE | 10 2012 109 391 A1 | 4/2014 |
| JP | 2013-052367 A1 | 3/2013 |

OTHER PUBLICATIONS

German Office Action (Application No. 10 2019 203 980.4) dated Nov. 26, 2020 (with English translation).

* cited by examiner

*Primary Examiner* — David Sample
*Assistant Examiner* — Elizabeth Collister
(74) *Attorney, Agent, or Firm* — Burr & Brown, PLLC

(57) ABSTRACT

A honeycomb structure comprising a pillar-shaped honeycomb structure body, wherein
the honeycomb structure body has at least one missing part,
the average size of the missing part is such that the radial length on the end face of the honeycomb structure body is 0.8 to 8.0 mm, the perimeter along the rim of the end face of the honeycomb structure body is 0.8 to 41.0 mm, and the axial length in the extending direction of the cells of the honeycomb structure body is 0.1 to 32.0 mm, and
a percentage of a ratio of total area of the missing part is 1.40% or less.

7 Claims, 5 Drawing Sheets

HONEYCOMB STRUCTURE

The present application is an application based on JP-2018-057064 filed on Mar. 23, 2018 with the Japan Patent Office, the entire contents of which are incorporated herein by reference.

BACKGROUND OF THE INVENTION

Field of the Invention

The present invention relates to a honeycomb structure. More specifically the present invention relates to a honeycomb structure capable of effectively suppressing a breakage due to compressing plane pressure applied to the honeycomb structure when the honeycomb structure is stored into a can as a casing.

Description of the Related Art

Developed countries are examining to tighten the regulations on NOx emission from diesel-fueled vehicles and tracks more. To meet such NOx emission regulations, various techniques have been proposed to treat NOx in exhaust gas. One of these techniques, for example, manufactures a honeycomb structure having a porous partition wall loaded with Selective Catalytic Reduction catalyst (hereinafter this may be called "SCR catalyst"), for example, and treats NOx in exhaust gas with the honeycomb structure for purification (see Patent Literature 1).

Such a honeycomb structure can be loaded with an increased amount of catalyst to treat NOx, so as to improve the ability to purify the exhaust gas. Meanwhile, when a honeycomb structure loaded with a catalyst is installed in the exhaust system of a diesel-fueled vehicle, for example, for NOx treatment, this may cause a problem of an increase of a pressure loss. Especially a honeycomb structure loaded with an increased amount of a catalyst to improve the purification performance may increase the pressure loss more remarkably. That is, a honeycomb structure to treat NOx has a tradeoff relationship between "improving the purification performance" and "suppressing an increase of a pressure loss". To overcome such a tradeoff relationship, a technique has been proposed to manufacture a honeycomb structure with increased a porosity of the partition wall. Such a honeycomb structure with an increased porosity of the partition wall is intended to suppress an increase of the pressure loss while increasing the amount of a catalyst for loading, for example.

[Patent Document 1] JP-A-2013-052367

SUMMARY OF THE INVENTION

Such a honeycomb structure with an increased porosity of the partition wall, however, has reduced a mechanical strength. As a result, such a honeycomb structure with the increased porosity of the partition wall has a problem that, when it is stored in a can as a casing, a breakage occurs easily due to compressing plane pressure applied to the outer circumferential face. One of the causes of the breakage includes handling during the manufacturing. If a partition wall in contact with the circumferential part wall is damaged during the manufacturing, such damage leads to a breakage of the honeycomb structure that originates from the damage.

In view of such problems of the conventional techniques, the present invention provides a honeycomb structure capable of effectively suppressing a breakage due to compressing plane pressure applied to the honeycomb structure when the honeycomb structure is stored into a can as a casing.

The present invention provides the following honeycomb structure.

[1] A honeycomb structure includes a pillar-shaped honeycomb structure body having a first end and a second end face, wherein
the honeycomb structure body includes: porous partition walls disposed so as to surround a plurality of cells extending from the first end face to the second end face; and a circumferential wall disposed to surround the partition walls,
the honeycomb structure body has a cross section orthogonal to the extending direction of the cells where the partition walls define the cells to have a polygonal shape in a grid pattern,
the honeycomb structure body has at least one missing part at an end-face edge where the first end face or the second end face intersects the circumferential wall, the missing part missing a part of the circumferential wall and the partition walls,
the missing part is disposed at least at one position having polar coordinates $(R, \theta)$ on the first end face or the second end face that makes up the end-face edge, the $\theta$ satisfying the value of $\theta_{(n=1,2 \ldots N)}$ in the following condition (1),
the average size of the missing part is such that the radial length on the end face of the honeycomb structure body is 0.8 to 8.0 mm, the perimeter along the rim of the end face of the honeycomb structure body is 0.8 to 41.0 mm, and the axial length in the extending direction of the cells of the honeycomb structure body is 0.1 to 32.0 mm, and
a percentage of a ratio of total area of the missing part on the lateral face of the honeycomb structure body to total area of the lateral face of the honeycomb structure body is 1.40% or less.

(Math. 1)

$$\theta_{(n=1,2 \ldots N)} = \{(\pi/N) + (2\pi/N) \times (n-1)\}(\pm\theta_{(where\ n=1)}/2) \quad \text{Condition (1):}$$

where R in the polar coordinates $(R, \theta)$ indicates a radial coordinate that represents the radius of the first end face or the second end face that makes up the end-face edge of the honeycomb structure body,
$\theta$ in the above polar coordinates $(R, \theta)$ indicates an angular coordinate having, as 0, the intersection on the first end face or the second end face where the rim of the end face intersects a line that is parallel to the grid-like aligned partition wall and passing through the center of the end face, and in the condition (1), N denotes the number of apexes of the polygonal cell, where N=4 to 8, and n denotes a natural number of N or less (n=1, 2 . . . N).

[2] The honeycomb structure according to [1], wherein the percentage of the ratio of total area of the missing part on the lateral face of the honeycomb structure body to total area of the lateral face of the honeycomb structure body is 0.01 to 1.40%.

[3] The honeycomb structure according to [1] or [2] include at least one of the missing part having the radial length on the end face of the honeycomb structure body that is 0.8 to 8.0 mm, the perimeter along the rim of the end face of the honeycomb structure body that is 0.8 to 41.0 mm, and the axial length in the extending direction of the cells of the honeycomb structure body that is 0.1 to 32.0 mm.

[4] The honeycomb structure according to any one of [1] to [3], wherein the partition wall has a thickness of 0.064 to 0.305 mm.

[5] The honeycomb structure according to any one of [1] to [4], wherein the honeycomb structure body has a cell density of 31 to 140 cells/cm².

[6] The honeycomb structure according to any one of [1] to [5], wherein the honeycomb structure body has an outer diameter of 50.8 to 355.6 mm.

[7] The honeycomb structure according to any one of [1] to [6], the honeycomb structure body has the axial length in the extending direction of each of the cells that is 50.8 to 431.8 mm.

A honeycomb structure of the present invention can effectively suppress a breakage due to compressing plane pressure applied to the honeycomb structure when the honeycomb structure is stored into a can as a casing. The honeycomb structure of the present invention therefore can contribute to the improvement of an isostatic strength.

DESCRIPTION OF THE PREFERRED EMBODIMENTS

The following describes embodiments of the present invention, and the present invention is not limited to the following embodiments. The present invention is to be understood to include the following embodiments, to which modifications and improvements are added as needed based on the ordinary knowledge of a person skilled in the art without departing from the scope of the present invention.

(1) Honeycomb Structure (First Embodiment)

Figure 1:
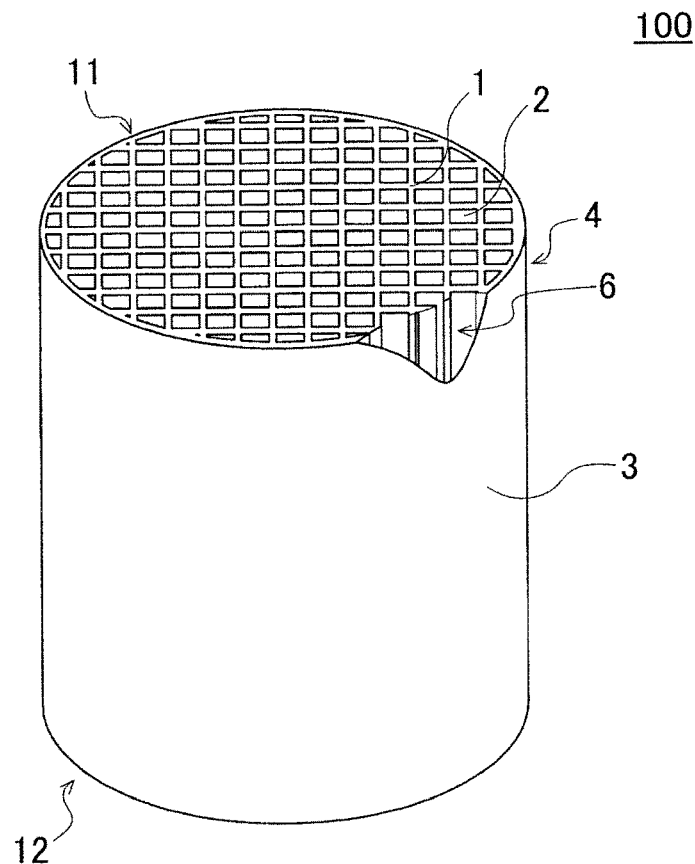
FIG. 1 is a perspective view schematically showing a first embodiment of the honeycomb structure of the present invention.
Figure 2:
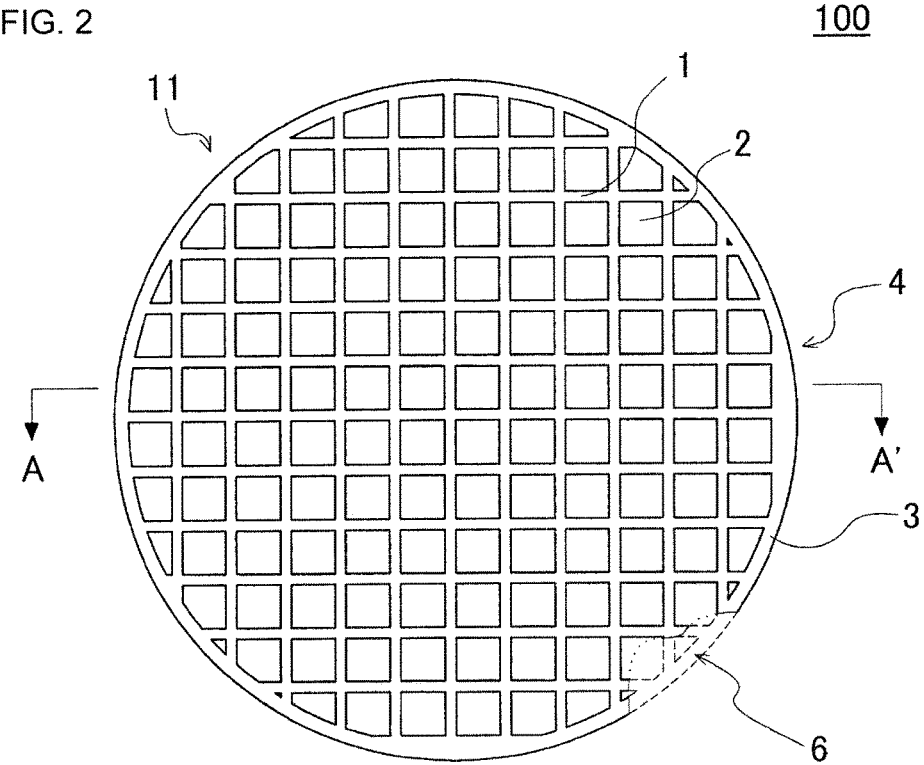
FIG. 2 is a plan view showing the side of the first end face of the honeycomb structure of FIG. 1.
Figure 3:
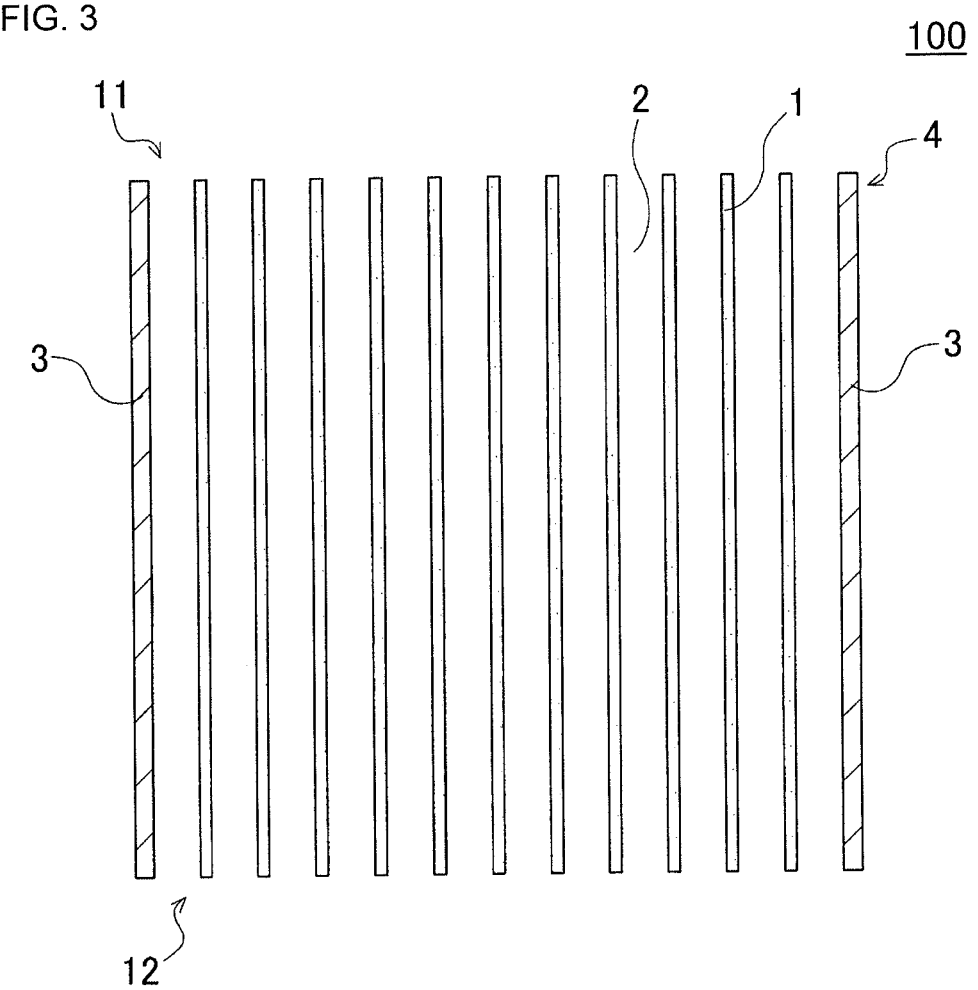
FIG. 3 is a schematic cross-sectional view taken along A-A' of FIG. 2.
Figure 4:
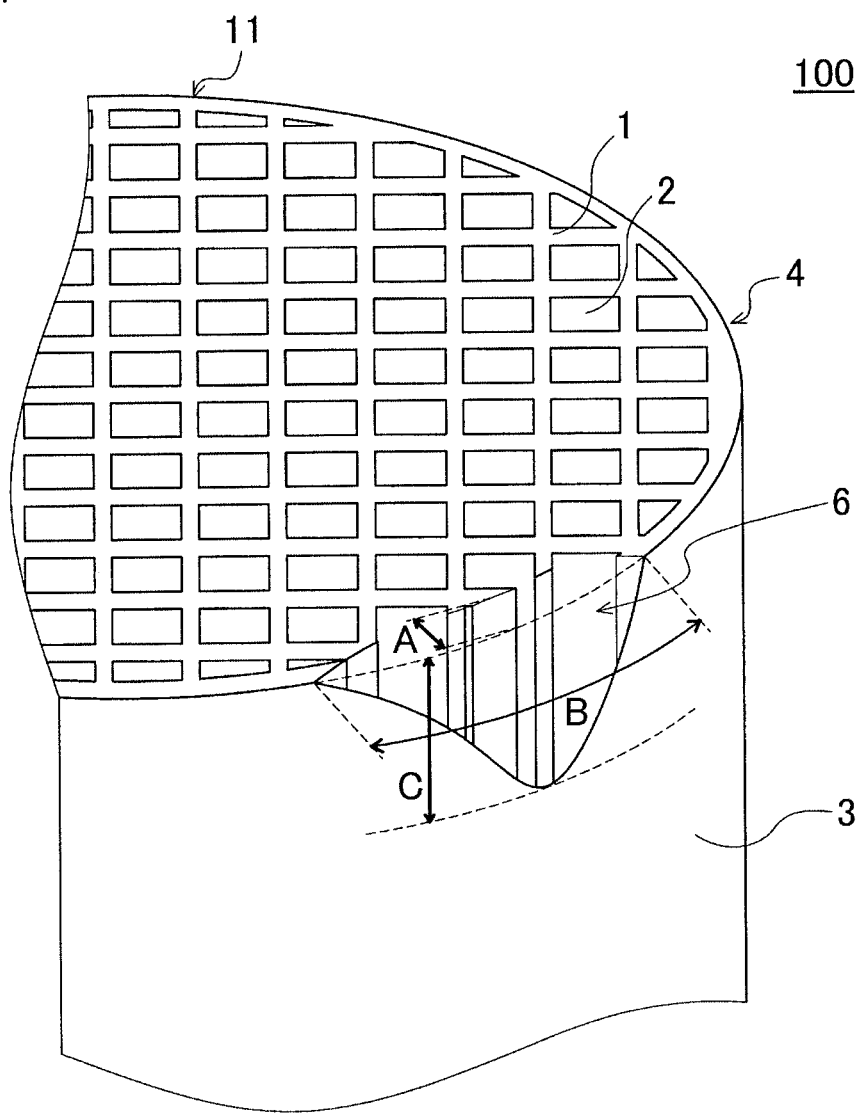
FIG. 4 is an enlarged perspective view of a part of the honeycomb structure of FIG. 1.

A first embodiment of the honeycomb structure of the present invention is a honeycomb structure 100 as shown in FIGS. 1 to 4. FIG. 1 is a perspective view schematically showing the first embodiment of the honeycomb structure of the present invention. FIG. 2 is a plan view showing the side of the first end face of the honeycomb structure of FIG. 1. FIG. 3 is a schematic cross-sectional view taken along A-A' of FIG. 2. FIG. 4 is an enlarged perspective view of a part of the honeycomb structure in FIG. 1.

As shown in FIGS. 1 to 4, the honeycomb structure 100 of the present embodiment includes a pillar-shaped honeycomb structure body 4 having a first end face 11 and a second end face 12. The honeycomb structure body 4 has porous partition walls 1 and a circumferential wall 3 disposed so as to surround the partition walls 1. That is, the circumferential wall 3 surrounds the grid-patterned partition walls 1. The porous partition walls 1 surround a plurality of cells 2, and the plurality of cells extends from the first end face 11 to the second end face 12 of the honeycomb structure body 4 and serves as through channels of fluid.

The honeycomb structure body 4 includes the cells 2 having a polygonal shape in a cross section orthogonal to the extending direction of the cells 2, and the partition walls 1 define these cells 2 in a grid pattern. Hereinafter the "shape of cells 2" refers to the shape of the cells 2 in a cross section orthogonal to the extending direction of the cells 2 in the honeycomb structure body 4. In the honeycomb structure 100 in FIG. 1 to FIG. 4, the shape of the cells 2 is a square. Although not limited especially, the shape of the cells 2 is preferably a quadrangle, a hexagon, and an octagon.

The honeycomb structure body 4 has a feature that an edge of the end face where the first end face 11 or the second end face 12 intersects the circumferential wall 3 has at least one missing part 6 where a part of the circumferential wall 3 and the partition walls 1 is missing. Such a missing part 6 can effectively suppress a breakage of the honeycomb structure due to compressing plane pressure applied to the honeycomb structure 100 when the honeycomb structure 100 is stored into a can as a casing.

In the honeycomb structure 100 of the present embodiment, such a missing part 6 is disposed at a predetermined position of the edge of the end face of the honeycomb structure body 4. More specifically the missing part 6 is disposed at least at one position having polar coordinates (R, θ) on the first end face 11 or the second end face 12 that make up the edge of the end face of the honeycomb structure body 4, where θ satisfies the value of $\theta_{(n=1,2\ldots N)}$ in the following condition (1).

(Math. 2)

$$\theta_{(n=1,2\ldots N)} = \{(\pi/N) + (2\pi/N) \times (n-1)\}(\pm\theta_{(where\ n=1)}/2) \quad \text{Condition (1):}$$

R in the above polar coordinates (R, θ) indicates a radial coordinate that represents the radius of the first end face 11 or the second end face 12 that makes up the edge of the end face of the honeycomb structure body 4. θ in the above polar coordinates (R, θ) indicates an angular coordinate having, as 0 (0° measured in degrees), the intersection on the first end face 11 or the second end face 12 where the rim of the end face (i.e., the first end face 11 or the second end face 12) intersects a line that is parallel to the grid-like aligned partition walls 1 and passing through the center of the end face.

In the above condition (1), N denotes the number of apexes of the polygonal cells 2, and N=4 to 8, and n denotes a natural number of N or less (n=1, 2 ... N). In the above condition (1), "$\pm\theta_{(where\ n=1)}/2$" means the range from "$-\theta_{(n=1)}/2$" to "$+\theta_{(n=1)}/2$".

The following describes an example of the value of $\theta_{(n=1,2\ldots N)}$ in the condition (1) where the shape of the cells 2 is a "quadrangle" in more details. When the shape of the cells 2 is a "quadrangle", N=4, and n denotes a natural number of 1, 2, 3, 4. Accordingly when the shape of the cells 2 is a "quadrangle", the condition (1) shows the following conditions (1-1) to (1-4).

Figure 5:
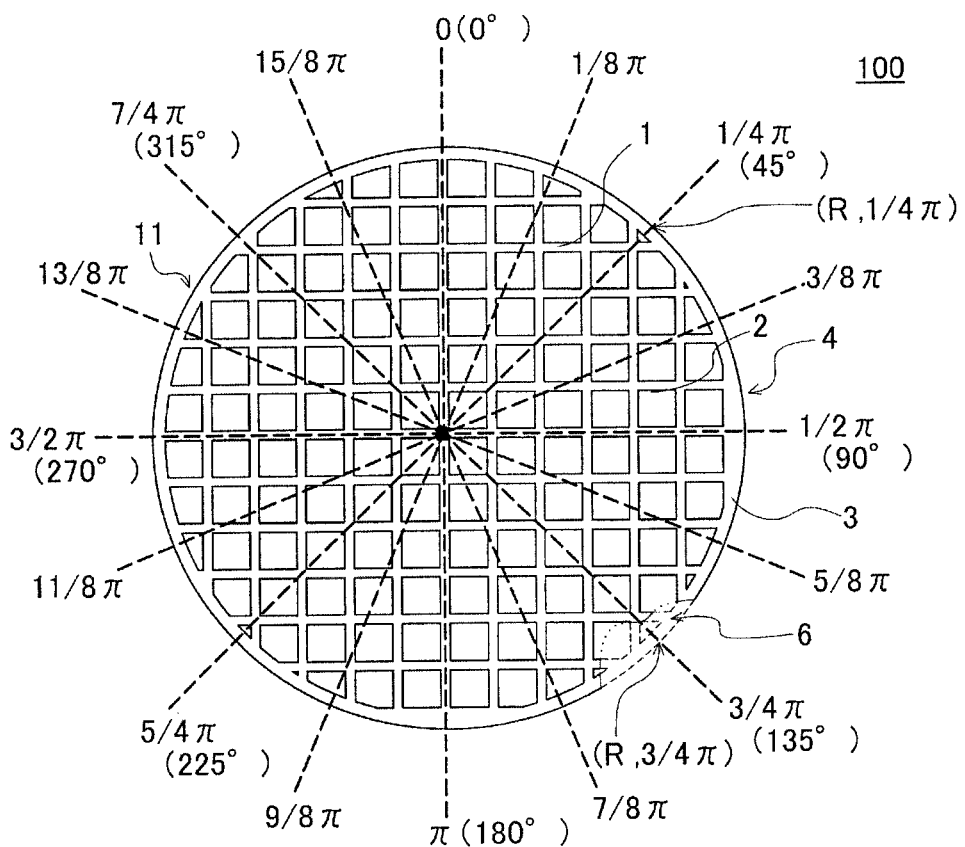
FIG. 5 is a plan view to explain the polar coordinates on the first end face of the honeycomb structure of FIG. 1.

$\pi/8 \leq \theta_{(n=1)} \leq 3\pi/8$      Condition (1-1):

$5\pi/8 \leq \theta_{(n=2)} \leq 7\pi/8$      Condition (1-2):

$9\pi/8 \leq \theta_{(n=3)} \leq 11\pi/8$      Condition (1-3):

$13\pi/8 \leq \theta_{(n=4)} \leq 15\pi/8$      Condition (1-4):

Referring to FIG. 5, the following describes the above polar coordinates (R, θ) in more details. FIG. 5 is a plan view to explain the polar coordinates on the first end face 11 of the honeycomb structure 100 of FIG. 1. As shown in FIG. 5, R in the polar coordinates (R, θ) indicates a radial coordinate that represents the radius of the first end face 11 that makes up the edge of the end face of the honeycomb structure body 4. The polar coordinates (R, θ) therefore can be said to indicate circular polar coordinates along the rim of the first end face 11. The following describes an example about the first end face 11 of the honeycomb structure body 4 with reference to FIG. 5, and polar coordinates (R, θ) can be specified similarly for the second end face 12 (see FIG. 1) of the honeycomb structure body 4 as well.

As shown in FIG. 5, θ in the polar coordinates (R, θ) indicates an angular coordinate having, as 0, the intersection where the rim of the first end face 11 intersects a line that is parallel to the grid-like aligned partition walls 1 and passing through the center of the first end face 11. $\theta_{(n=1,2\ldots N)}$ in the condition (1) indicates the range of angular coordinates that θ in polar coordinates (R, θ) can have. For instance, in FIG. 5, the missing part 6 is disposed in the range satisfying the above condition (1-2) (i.e., $5\pi/8 \leq \theta_{(n=2)} \leq 7\pi/8$) on the first end face 11 that makes up the edge of the end face of the honeycomb structure body 4. For instance, when the shape of the cells 2 is a "hexagon", N=6, and n=1, 2, 3, 4, 5, 6. Then the value of θ(n=1,2,3,4,5,6) (the range of angular coordinates that θ can have) in the condition (1) can be specified as in the example of the above example of the quadrangle.

Such a missing part 6, which is disposed at least at one position satisfying the value of $\theta_{(n=1,2\ldots N)}$ in the above condition (1) in the polar coordinates (R, θ), can effectively suppress a breakage of the honeycomb structure due to compressing plane pressure applied to the honeycomb structure 100. If the missing part is disposed at a position other than that indicated by the above condition (1), a sufficient effect of suppressing a breakage of the honeycomb structure due to compressing plane pressure cannot be obtained. Instead, such a missing part 6 may reduce an isostatic strength of the honeycomb structure 100.

The honeycomb structure 100 of the present embodiment has the missing part 6 as shown in FIGS. 1, 2 and 4 having the following average size. When the honeycomb structure has one missing part 6, the average size of the missing part 6 is the size of the missing part 6 (i.e., the maximum value of each dimension). When the honeycomb structure has two or more missing parts 6, the average size of the missing parts 6 is a value of the arithmetic average of the maximum values of the dimensions of these missing parts 6. The radial length A of the missing part 6 on the first end face 11 of the honeycomb structure body 4 may have the average size of 0.8 to 8.0 mm. The perimeter B along the rim of the first end face 11 of the honeycomb structure body 4 may have the average size of 0.8 to 41.0 mm. The axial length C in the extending direction of the cells 2 of the honeycomb structure body 4 may have the average size of 0.1 to 32.0 mm. Such a configuration can effectively suppress a breakage due to compressing plane pressure while keeping the isostatic strength of the honeycomb structure 100. Note here that missing parts 6 that are valid to calculate the average size of two or more missing parts 6 have the maximum dimension of any one of the radial length, the perimeter and the axial length of the missing part 6 that is at least 0.1 mm.

Although not limited especially, the average size of the radial length A of the missing part(s) 6 on the first end face 11 of the honeycomb structure body 4 is preferably 0.8 to 6.0 mm, and more preferably 0.8 to 4.0 mm. The average size of the perimeter B along the rim of the first end face 11 of the honeycomb structure body 4 is preferably 0.8 to 30.0 mm, and more preferably 0.8 to 20.0 mm. The average size of the axial length C in the extending direction of the cells 2 of the honeycomb structure body 4 is preferably 0.8 to 24.0 mm, and more preferably 0.8 to 16.0 mm. Such a configuration can effectively suppress a breakage due to compressing plane pressure.

The honeycomb structure 100 of the present embodiment has the percentage of the ratio of the total area of the missing part(s) 6 on the lateral face of the honeycomb structure body 4 to the total area of the lateral face of the honeycomb structure body 4 that is 1.40% or less. Such a configuration can effectively suppress a decrease in an isostatic strength of the honeycomb structure 100. This percentage of the ratio of the total area of the missing part(s) 6 is preferably 0.01 to 1.40% and more preferably 0.01 to 0.5%.

When the honeycomb structure has a plurality of missing parts 6, at least one of these missing part 6 satisfies the above-stated average sizes preferably. That is, the honeycomb structure preferably has at least one missing part 6 having the radial length A on the end face that is 0.8 to 8.0 mm, the perimeter B along the rim of the end face that is 0.8 to 41.0 mm, and the axial length C in the extending direction of the cells 2 that is 0.1 to 32.0 mm. Such a configuration can effectively achieve more favorable effect of suppressing a breakage due to compressing plane pressure applied to the honeycomb structure.

A missing part 6 is a part where a part of the circumferential wall 3 and the partition walls 1 is missing (losing). Such a missing part 6 is preferably placed substantially only at the position represented by the polar coordinates (R, θ) satisfying the above condition (1). Such a missing part 6 is preferably placed substantially within the position represented by the polar coordinates (R, θ) satisfying the above condition (1).

The number of the missing parts 6 is not limited especially. In one example, as long as the average size of the missing part(s) 6 satisfies the above numerical values and the "percentage of the ratio of the total area of the missing part(s) 6" as stated above is 1.40% or less, the honeycomb structure may have a plurality of missing parts 6 placed at the edge of each of the first end face 11 and of the second end face 12.

In the honeycomb structure 100, the partition wall 1 preferably has a thickness of 0.064 to 0.305 mm, and more preferably 0.089 to 0.132 mm. The thickness of the partition wall 1 can be measured with a scanning electron microscope or a microscope, for example. If the thickness of the partition wall 1 is less than 0.064 mm, the strength may not be enough. If the thickness of the partition wall 1 exceeds 0.305 mm, the pressure loss of the honeycomb structure 100 may increase.

Preferably the cells 2 defined by the partition walls 1 have a cell density that is 31 to 140 cells/cm$^2$, and 47 to 93 cells/cm$^2$ more preferably. The thus configured honeycomb structure 100 of the present embodiment can be favorably used as a member for purification (e.g., catalyst carrier or filter) to purify exhaust gas emitted from an automobile engine.

In the honeycomb structure 100, the partition wall 1 preferably has a porosity of 27 to 65%, more preferably 27 to 55% and particularly preferably 30 to 55%. The porosity of the partition wall 1 is a value measured by a mercury intrusion porosimetry. If the porosity of the partition wall 1 is less than 27%, a catalyst loaded in the honeycomb structure 100 may peel off when the honeycomb structure is used as a member, such as a catalyst carrier, to purify exhaust gas. If the porosity of the partition wall 1 exceeds 65%, the strength may not be enough.

Although the thickness of the circumferential wall 3 of the honeycomb structure body 4 is not limited especially, the thickness is preferably 0.1 to 8.0 mm, for example, more preferably 0.1 to 4.0 mm, and particularly preferably 0.1 to 2.0 mm. The thickness of the circumferential wall 3 can be measured with a scanning electron microscope or a microscope, for example. If the thickness of the circumferential wall 3 is less than 0.1 mm, the strength may not be enough. If the thickness of the circumferential wall 3 exceeds 8.0 mm, the pressure loss of the honeycomb structure 100 may increase.

The circumferential wall 3 of the honeycomb structure body 4 may be monolithic with the partition walls 1 or may be a circumference coating layer that is formed by applying a circumference coating material so as to surround the partition walls 1. Although not illustrated, during the manufacturing process, the partition walls and the circumferential wall may be formed in a monolithic manner, and then the circumferential wall formed may be removed by a known method, such as grinding. Then, the circumference coating layer may be disposed at the circumference of the partition walls.

The shape of the honeycomb structure body 4 is not limited especially. Examples of the shape of the honeycomb structure body 4 include a pillar shape in which the first end face 11 and the second end face 12 have a shape, such as a circle or an ellipse.

The size of the honeycomb structure body 4, including the outer diameter of the honeycomb structure body 4 and the axial length in the extending direction of the cells 2, is not limited especially. Each size may be selected appropriately so that the honeycomb structure 100 of the present embodiment can have the optimum ability for purification when it is used as a member to purify exhaust gas. For instance, the outer diameter of the honeycomb structure body 4 (e.g., diameter of the first end face 11) is preferably 50.8 to 355.6 mm, and more preferably 76.2 to 330.2 mm. The axial length in the extending direction of the cells 2 of the honeycomb structure body 4 is preferably 50.8 to 431.8 mm, and more preferably 101.6 to 254.0 mm.

Preferably the partition wall 1 is made of at least one type of materials selected from the group consisting of silicon carbide, cordierite, silicon-silicon carbide composite material, cordierite-silicon carbide composite material, silicon nitride, mullite, alumina, and aluminum titanate. The material of the partition wall 1 preferably includes the materials as stated above accounting for 30 mass % or more, more preferably 40 mass % or more, and particularly preferably 50 mass % or more. The silicon-silicon carbide composite material is a composite material including silicon carbide as the aggregate and silicon as the binder. The cordierite-silicon carbide composite material is a composite material including silicon carbide as the aggregate and cordierite as the binder. In the honeycomb structure 100 of the present embodiment, a particularly preferable material of the partition wall 1 is cordierite.

(2) Honeycomb Structure (Second Embodiment)

Figure 6:
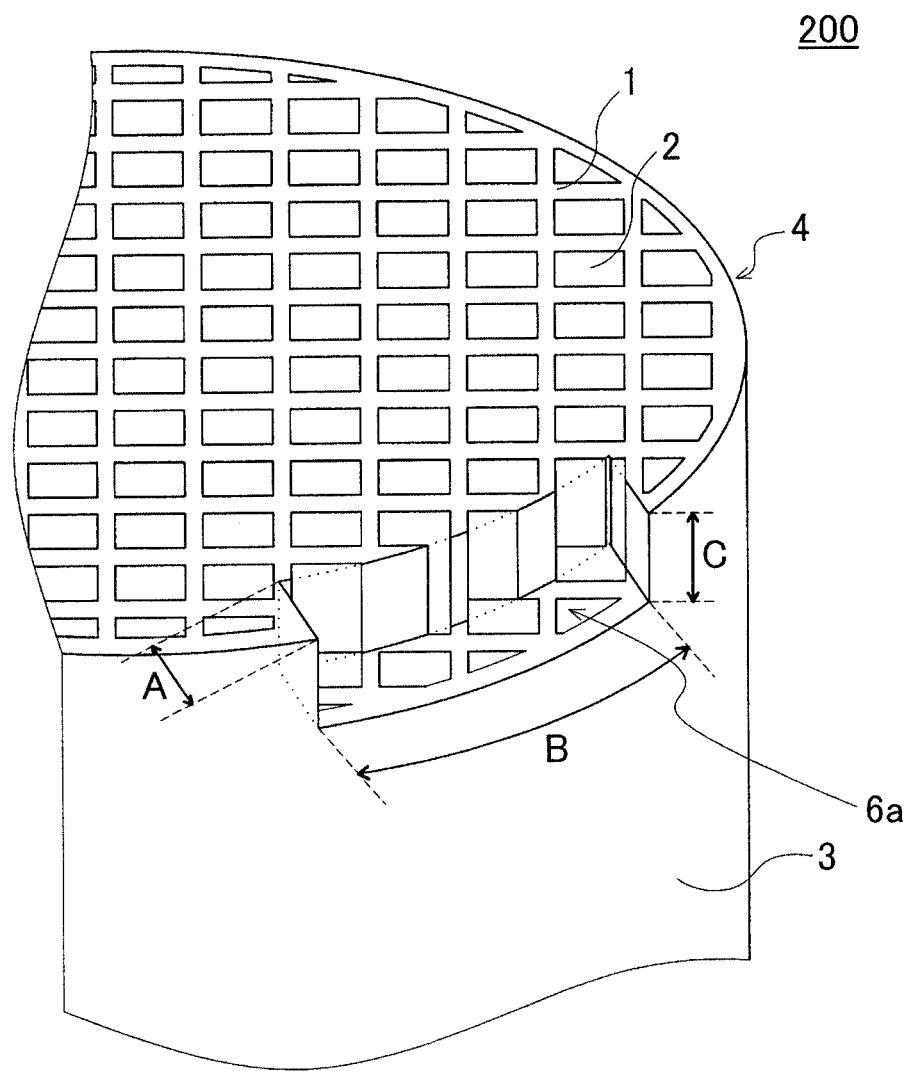
FIG. 6 is an enlarged perspective view schematically showing a second embodiment of the honeycomb structure of the present invention.

The following describes a second embodiment of the honeycomb structure of the present invention. The second embodiment of the honeycomb structure of the present invention is a honeycomb structure 200 as shown in FIG. 6. FIG. 6 is an enlarged perspective view schematically showing the second embodiment of the honeycomb structure of the present invention. In FIG. 6, like numerals indicate like components of honeycomb structure 100 shown in FIG. 1 to FIG. 4, and their description may be omitted.

The honeycomb structure 200 in FIG. 6 includes a pillar-shaped honeycomb structure body 4 having a first end face 11 and a second end face (not illustrated). The honeycomb structure body 4 has porous partition walls 1 and a circumferential wall 3 disposed so as to surround the partition walls 1.

As shown in FIG. 6, the honeycomb structure body 4 has a missing part 6a at the edge of the end face where the first end face 11 and the circumferential wall 3 intersect and a part of the circumferential wall 3 and the partition walls 1 is missing. The missing part 6a of the honeycomb structure 200 of the present embodiment is different in shape from the missing part 6 of the honeycomb structure 100 of FIG. 4. The missing part 6 of the honeycomb structure 100 of FIG. 4, for example, has a shape such that a part of the edge of the end face on the side of the first end face 11 is cut out in an indeterminate shape. On the contrary, as shown in FIG. 6, the missing part 6a of the honeycomb structure 200 of the present embodiment has a cut-out shape such that all of the radial length A on the first end face 11, the perimeter B along the rim of the first end face 11 and the axial length C in the extending direction of the cells 2 are constant at the edge of the end face on the side of the first end face 11. The thus configured honeycomb structure 200 also can effectively suppress a breakage of the honeycomb structure due to compressing plane pressure applied to the honeycomb structure 200 when the honeycomb structure 200 is stored into a can as a casing. The shape of the missing part 6a of the honeycomb structure 200 is not limited to the shape as in FIG. 6, and may be changed variously. That is, the shape of the missing part 6a of the honeycomb structure 200 is not limited especially as long as the radial length A on the first end face 11, the perimeter B along the rim of the first end face 11 and the axial length C in the extending direction of the cells 2 are within predetermined ranges of numerical values.

(3) Method for Manufacturing a Honeycomb Structure

A method for manufacturing the honeycomb structure of the present invention is not limited especially, and the honeycomb structure can be manufactured by the following method, for example. Firstly a kneaded material having plasticity is prepared to produce a honeycomb structure body. The kneaded material to produce a honeycomb structure body can be prepared by adding additives, such as a binder, a pore former and water as needed to a material selected as a raw material powder from the aforementioned materials suitable for the honeycomb structure body. As the raw material powder, silicon carbide powder and metal silicon powder may be mixed for use, for example. Examples of the binder include methylcellulose and hydroxypropyl methylcellulose. Examples of the additives include surfactants.

The thus prepared kneaded material is extruded, thereby producing a pillar-shaped honeycomb formed body having partition walls defining a plurality of cells and a circumferential wall surrounding these partition walls. Hereinafter one end face of the pillar-shaped honeycomb formed body is called a "first end face" and the other end face is called a "second end face".

The thus obtained honeycomb formed body is then dried by microwaves and hot air, for example. Next a part of the circumferential wall and the partition walls is removed at the edge of the end face of the dried honeycomb formed body where the first end face or the second end face and the circumferential wall intersect to form a missing part. A method for forming such a missing part may include cutting of a lateral face of the honeycomb formed body by milling.

Next the honeycomb formed body is fired to manufacture a honeycomb structure. Temperatures and atmosphere for the firing differ according to the raw material, and those skilled in the art can select the temperature and atmosphere for the firing that are the most suitable for the selected material. After firing of the honeycomb formed body, a part of the circumferential wall and the partition wall may be removed at the edge of the end face of the honeycomb structure to form missing parts.

EXAMPLES

The following describes the present invention more specifically by way of examples, and the present invention is by no means limited to these examples.

Example 1

2.0 parts by mass of a pore former, 60 parts by mass of a dispersing medium, and 5.6 parts by mass of an organic binder were added to 100 parts by mass of the cordierite forming raw material, followed by mixing and kneading to prepare a kneaded material. As the cordierite forming raw material, alumina, aluminum hydroxide, kaolin, talc, and silica were used. As the dispersing medium, water was used. As the organic binder, methylcellulose was used. As the dispersing agent, dextrin was used. As the pore former, a water absorptive polymer was used.

Next, the kneaded material was extruded using a die for manufacturing of a honeycomb formed body to have a honeycomb formed body having a round pillar shape as the overall shape. The cells of the honeycomb formed body had a quadrangular shape.

Next, this honeycomb formed body was dried by a microwave dryer, and then was dried completely by a hot-air drier, and then both end faces of the honeycomb formed body were cut so as to have predetermined dimensions.

Next a part of the circumferential wall and the partition walls was removed at the edge of the end face of the dried honeycomb formed body where the first end face and the circumferential wall intersected to form missing parts. The missing parts were formed by milling. In Example 1, three missing parts were formed so that they had the average size as indicated in "Avg. size of missing parts" in Table 1. The column of "Polar coordinates (R, θ) of missing parts" in Table 2 shows the position of the missing parts. R in the polar coordinates (R, θ) indicates a radial coordinate that represents the radius of the first end face or the second end face. θ in the above polar coordinates (R, θ) indicates an angular coordinate having, as 0, the intersection on the first end face or the second end face where the rim of the end face intersected a line that was parallel to the grid-like aligned partition walls and passing through the center of the end face.

Next the dried honeycomb formed body was degreased and fired, so as to obtain a honeycomb structure of Example 1.

The honeycomb structure of Example 1 had a round pillar shape, where the shapes of the first end face and the second end face were round. The first end face and the second end face had the outer diameter (diameter) of 355.6 mm. The honeycomb structure had the length (overall length) in the cell extending direction of 254 mm. The honeycomb structure body of the honeycomb structure had a surface area on the lateral face of 2837.5 cm$^2$. The honeycomb structure of Example 1 had the thickness of the partition wall of 0.089 mm and the cell density of 93 cells/cm$^2$. Table 1 shows the dimensions of the honeycomb structure. The honeycomb structure had the porosity of the partition wall that was 50%. The porosity of the partition wall was measured using Autopore 9500 (product name) produced by Micromeritics Co.

The honeycomb structure of Example 1 had three missing parts at the edge of the end face on the side of the first end face. These missing parts had the average size as shown in Table 1, such that the radial length was 8.0 mm, the perimeter was 41.0 mm, and the axial length was 16.8 mm. The cumulative perimeter of the missing parts was 123.0 mm.

TABLE 1

| | Honeycomb structure body | | | Cell structure | | | | Avg. size of missing parts | | | |
| | | | | Partition | | | | Number of | | | | Cumulative |
| | Outer diameter (mm) | Oveall length (mm) | Lateral face surface area (cm$^2$) | wall thickness (mm) | Cell density (cells/cm$^2$) | Cell shape | Porosity (%) | missing parts (pieces) | Radial length (mm) | Perimeter (mm) | Axial length (mm) | perimeter of missing parts (mm) |
|---|---|---|---|---|---|---|---|---|---|---|---|---|
| Ex. 1 | 355.6 | 254 | 2837.6 | 0.089 | 93 | quadrangle | 51 | 3 | 8.0 | 41.0 | 16.8 | 123.0 |
| Ex. 2 | 76.2 | 50.8 | 121.6 | 0.089 | 93 | quadrangle | 33 | 1 | 3.2 | 34.4 | 5.0 | 34.4 |
| Ex. 3 | 330.2 | 101.6 | 1054.0 | 0.114 | 62 | quadrangle | 50 | 6 | 1.4 | 35.0 | 4.4 | 210.0 |
| Ex. 4 | 190.5 | 177.8 | 1064.1 | 0.114 | 93 | quadrangle | 65 | 3 | 2.4 | 22.1 | 10.0 | 66.3 |
| Ex. 5 | 266.7 | 152.4 | 1276.9 | 0.165 | 47 | quadrangle | 49 | 1 | 1.9 | 19.9 | 32.0 | 19.9 |
| Ex. 6 | 266.7 | 152.4 | 1276.9 | 0.064 | 93 | quadrangle | 27 | 4 | 4.3 | 19.3 | 9.0 | 77.2 |
| Ex. 7 | 304.8 | 101.6 | 972.9 | 0.089 | 116 | quadrangle | 50 | 5 | 4.3 | 30.4 | 8.4 | 152.0 |
| Ex. 8 | 304.8 | 203.2 | 1945.8 | 0.089 | 140 | quadrangle | 48 | 1 | 3.4 | 0.8 | 14.0 | 0.8 |
| Ex. 9 | 50.8 | 76.2 | 121.6 | 0.064 | 140 | quadrangle | 35 | 2 | 6.2 | 40.2 | 0.1 | 80.4 |
| Ex. 10 | 143.8 | 152.4 | 688.5 | 0.132 | 47 | quadrangle | 52 | 1 | 0.8 | 19.5 | 12.8 | 19.5 |
| Ex. 11 | 330.2 | 101.6 | 1054.0 | 0.089 | 93 | quadrangle | 50 | 7 | 3.0 | 25.2 | 7.1 | 176.4 |
| Ex. 12 | 355.6 | 431.8 | 4823.9 | 0.203 | 31 | quadrangle | 59 | 2 | 5.0 | 25 | 10.0 | 50.0 |
| Ex. 13 | 143.8 | 152.4 | 688.5 | 0.305 | 31 | quadrangle | 65 | 1 | 6.0 | 21 | 21.0 | 21.0 |
| Ex. 14 | 266.7 | 152.4 | 1276.9 | 0.114 | 62 | hexagon | 50 | 1 | 3.0 | 5.0 | 12.0 | 5.0 |
| Ex. 15 | 143.8 | 152.4 | 688.5 | 0.089 | 93 | hexagon | 35 | 2 | 4.1 | 3.2 | 9.8 | 6.4 |
| Comp. Ex. 1 | 266.7 | 152.4 | 1276.9 | 0.114 | 62 | quadrangle | 70 | 4 | 8.1 | 20.4 | 0.5 | 81.6 |
| Comp. | 330.2 | 101.6 | 1054.0 | 0.089 | 93 | quadrangle | 47 | 1 | 5.1 | 41.1 | 4.5 | 41.1 |

TABLE 1-continued

| | Honeycomb structure body | | | Cell structure | | | | Number of missing parts (pieces) | Avg. size of missing parts | | | Cumulative perimeter of missing parts (mm) |
|---|---|---|---|---|---|---|---|---|---|---|---|---|
| | Outer diameter (mm) | Oveall length (mm) | Lateral face surface area (cm²) | Partition wall thickness (mm) | Cell density (cells/cm²) | Cell shape | Porosity (%) | | Radial length (mm) | Perimeter (mm) | Axial length (mm) | |
| Ex. 2 Comp. Ex. 3 | 190.5 | 127 | 760.1 | 0.132 | 47 | quadrangle | 53 | 2 | 1.6 | 10.2 | 32.1 | 20.4 |
| Comp. Ex. 4 | 76.2 | 50.8 | 121.6 | 0.140 | 62 | quadrangle | 51 | 2 | 2.3 | 9.1 | 10.3 | 18.2 |
| Comp. Ex. 5 | 190.5 | 127 | 760.1 | 0.132 | 47 | quadrangle | 48 | 1 | 3.2 | 0.7 | 37.0 | 0.7 |
| Comp. Ex. 6 | 50.8 | 50.8 | 81.1 | 0.132 | 47 | quadrangle | 50 | 2 | 0.7 | 6.2 | 9.4 | 12.4 |
| Comp. Ex. 7 | 355.6 | 254 | 2838 | 0.089 | 93 | quadrangle | 50 | 0 | — | — | — | — |

TABLE 2

| | Polar coordinates (R, θ) of missing parts | |
|---|---|---|
| | 1st end face | 2nd end face |
| Example 1 | (R, π/8), (R, 3π/8), (R, 7π/4) | not formed |
| Example 2 | (R, 5π/8) | not formed |
| Example 3 | (R, π/4), (R, 3π/4), (R, 7π/8) | (R, π/4), (R, 3π/4), (R, 3π/8) |
| Example 4 | (R, π/4), (R, 3π/4), (R, 9π/8) | not formed |
| Example 5 | (R, 13π/8) | not formed |
| Example 6 | (R, π/4), (R, 3π/4), (R, 7π/4) | (R, 11π/8) |
| Example 7 | (R, π/4), (R, 3π/4), (R, 7π/4), (R, 15π/8) | (R, π/4) |
| Example 8 | (R, π/4) | not formed |
| Example 9 | (R, 3π/4) | (R, π/4) |
| Example 10 | (R, π/8) | not formed |
| Example 11 | (R, π/4), (R, 3π/4), (R, 7π/4) | (R, 7π/4), (R, π/4), (R, 7π/4) |

TABLE 2-continued

| | Polar coordinates (R, θ) of missing parts | |
|---|---|---|
| | 1st end face | 2nd end face |
| Example 12 | (R, π/4), (R, 7π/4) | not formed |
| Example 13 | (R, π/8) | not formed |
| Example 14 | (R, 5π/12) | not formed |
| Example 15 | (R, 3π/6) | (R, π/6) |
| Comparative. Example 1 | (R, 3π/4) | (R, π/4), (R, 5π/4), (R, 11π/8) |
| Comparative. Example 2 | (R, 3π/4) | not formed |
| Comparative. Example 3 | (R, π/4), (R, 5π/4) | not formed |
| Comparative. Example 4 | (R, π/4), (R, 5π/4) | not formed |
| Comparative. Example 5 | (R, π/4) | not formed |
| Comparative. Example 6 | (R, 5π/4), (R, 5π/4) | not formed |
| Comparative. Example 7 | not formed | not formed |

TABLE 3

| | Area of missing parts (cm²) | Area ratio of missing parts (%) | Ratio of isostatic strength (—) | Test to apply plane pressure during canning (MPa) | Canning test evaluation |
|---|---|---|---|---|---|
| Example 1 | 20.7 | 0.73 | 0.94 | 0.5 | Accepted |
| Example 2 | 1.7 | 1.40 | 0.84 | 0.5 | Accepted |
| Example 3 | 9.2 | 0.88 | 0.96 | 0.5 | Accepted |
| Example 4 | 6.6 | 0.62 | 0.89 | 0.5 | Accepted |
| Example 5 | 6.4 | 0.50 | 1.00 | 0.5 | Accepted |
| Example 6 | 6.9 | 0.54 | 1.00 | 0.5 | Accepted |
| Example 7 | 12.8 | 1.31 | 0.80 | 0.5 | Accepted |
| Example 8 | 0.1 | 0.01 | 1.00 | 0.5 | Accepted |
| Example 9 | 0.1 | 0.07 | 0.90 | 0.5 | Accepted |
| Example 10 | 2.5 | 0.36 | 0.98 | 0.5 | Accepted |
| Example 11 | 12.5 | 1.19 | 0.86 | 0.5 | Accepted |
| Example 12 | 5.0 | 0.10 | 0.99 | 0.5 | Accepted |
| Example 13 | 4.4 | 0.64 | 0.87 | 0.5 | Accepted |
| Example 14 | 0.6 | 0.05 | 0.98 | 0.5 | Accepted |
| Example 15 | 0.6 | 0.09 | 0.97 | 0.5 | Accepted |
| Comparative Example 1 | 0.4 | 0.03 | 0.90 | 0.5 | Rejected |
| Comparative Example 2 | 1.8 | 0.18 | 0.75 | 0.5 | Rejected |
| Comparative Example 3 | 6.5 | 0.86 | 0.78 | 0.5 | Rejected |
| Comparative Example 4 | 1.9 | 1.54 | 0.78 | 0.5 | Rejected |
| Comparative Example 5 | 0.3 | 0.03 | 0.77 | 0.5 | Accepted |
| Comparative Example 6 | 1.2 | 1.44 | 0.75 | 0.5 | Accepted |
| Comparative Example 7 | — | — | 0.72 | 0.5 | Rejected |

For the honeycomb structure of Example 1, an isostatic strength was measured by the following method, and a "ratio of isostatic strength" was obtained based on the result of measurement. Table 3 shows the result. For the honeycomb structure of Example 1, "test to apply plane pressure during canning" was performed by the following method. Table 3 shows the result of the test. The column of "Area of missing parts" in Table 3 shows the total area (cm$^2$) of the missing parts on the lateral face of the honeycomb structure body. The column of "Area ratio of missing parts" shows the percentage (%) of the ratio of the total area of the missing parts on the lateral face of the honeycomb structure body to the total area of the lateral face of the honeycomb structure body.

(Isostatic Strength (MPa))

An isostatic strength was measured in accordance with the isostatic fracture strength testing specified at M505-87 of the Japanese Automotive Standards Organization (JASO) that is a specification issued by the Society of Automotive Engineers of Japan. The isostatic fracture strength testing is conducted by placing a honeycomb structure in a rubber-made tubular container, which is sealed with an aluminum plate, and then applying an isostatic pressure thereto in water. An isostatic strength measured by this isostatic fracture strength testing is indicated as a pressure (MPa) applied when the honeycomb structure breaks down. The column of "Ratio of isostatic strength" in Table 3 shows the ratio of isostatic strength of the honeycomb structures of Examples and Comparative Examples to the isostatic strength of the honeycomb structures without defects generated during the manufacturing process or the intentional missing parts. The honeycomb structure having the "Ratio of isostatic strength" that was 0.80 or more was accepted.

(Test to Apply Plane Pressure During Canning)

The test to apply plane pressure during canning was conducted as follows. A ceramic-fiber mat was wound around a honeycomb structure, and this honeycomb structure was placed in a can for tightening using a tourniquet device and was tightened with a constant load so that the design plane pressure was 0.5 MPa.

Evaluation (hereinafter this may be called "canning test evaluation") on the test to apply plane pressure during canning was performed based on the following standard. The column of "Canning test evaluation" in Table 3 shows the result.

When a honeycomb structure did not have a breakage after tightening using the tourniquet, the honeycomb structure was "accepted".

When a honeycomb structure had a breakage after tightening using the tourniquet, the honeycomb structure was "rejected".

Examples 2 to 15

As shown in Table 1, honeycomb structures of these Examples were manufactured by changing the dimensions, the number of missing parts and their average size. The positions of the missing parts are as shown in the column of "polar coordinates of (R, θ) of missing parts" in Table 2. In Table 2, the column of "first end face" shows polar coordinates (R, θ) of the missing parts at the edge of the end face on the side of the first end face, and the column of "second end face" shows polar coordinates (R, θ) of the missing parts at the edge of the end face on the side of the second end face. Each of the polar coordinates (R, θ) on the side of the first end face and of the second end face were set so that their points at "θ=0" were located at the axially same position in the extending direction of the cells. The honeycomb structures of Examples 14 and 15 had a hexagonal cell shape.

Comparative Examples 1 to 7

As shown in Table 1, honeycomb structures of these Comparative Examples were manufactured by changing the dimensions, the number of missing parts and their average size. The positions of the missing parts are as shown in the column of "polar coordinates of (R, θ) of missing parts" in Table 2. The honeycomb structure of Comparative Example 7 did not have any missing part at the edge of the end face on the side of the first end face and of the second end face.

For the honeycomb structures of Examples 2 to 15 and Comparative Examples 1 to 7, an isostatic strength was measured similarly to Example 1, and a "ratio of isostatic strength" was obtained based on the result of measurement. The "test to apply plane pressure during canning" was performed similarly to Example 1. "Canning test evaluation" was performed based on the result of the test to apply plane pressure during canning. Table 3 shows the results.

(Results)

The honeycomb structures of Examples 1 to 15 had the values of "ratio of isostatic strength" that were 0.8 or more, and was accepted for the canning test evaluation as well while suppressing a reduction in an isostatic strength.

On the contrary, the honeycomb structure of Comparative Example 1 had the radial length of the missing part that was 8.1 mm. In this way, the too large missing part caused concentration of stress during canning, and caused a breakage of the honeycomb structure. The honeycomb structure of Comparative Example 1 therefore was rejected about the canning test evaluation. The honeycomb structure of Comparative Example 2 had the perimeter of the missing part that was 41.1 mm, and the honeycomb structure of Comparative Example 3 had the axial length of the missing part that was 32.1 mm. In this way, the missing parts of these Comparative Examples were too large similar to Comparative Example 1, which caused concentration of stress during canning, and caused a breakage of the honeycomb structures. The honeycomb structures of Comparative Examples 2 and 3 also were rejected about the canning test evaluation. The honeycomb structure of Comparative Example 4 had the ratio of area at the missing part that was 1.54%. In this way, the ratio of the missing part to the entire lateral face was too large, and the honeycomb structure was rejected for canning test evaluation. The average size of the missing parts of the honeycomb structures of Comparative Examples 5 to 7 was too small, and the honeycomb structures still had defects. The isostatic strength of these honeycomb structures reduced greatly, and the ratio of isostatic strength was less than 0.8.

The honeycomb structure of the present invention can be used for a catalyst carrier to be loaded with a catalyst that purifies exhaust gas.

DESCRIPTION OF REFERENCE NUMERALS

1: partition wall 2: cell, 3: circumferential wall 4: honeycomb structure body 6, 6a: missing part 11: first end face 12: second end face 100, 200: honeycomb structure

What is claimed is:

1. A honeycomb structure comprising a pillar-shaped honeycomb structure body having a first end and a second end face, wherein the honeycomb structure body includes: porous partition walls disposed so as to surround a plurality of cells extending from the first end face to the second end face; and a circumferential wall disposed to surround the partition walls, the honeycomb structure body has a cross section orthogonal to the extending direction of the cells where the partition walls define the cells to have a polygonal shape in a grid pattern, the honeycomb structure body has at least one missing part at an end-face edge where the first end face or the second end face intersects the circumferential wall, the missing part missing a part of the circumferential wall and the partition walls, the missing part is disposed at least at one position having polar coordinates $(R, \theta)$ on the first end face or the second end face that makes up the end-face edge, the $\theta$ satisfying the value of $\theta_{(n=1,2\ldots N)}$ in the following condition (1), the average size of the missing part is such that the radial length on the end face of the honeycomb structure body is 0.8 to 8.0 mm, the perimeter along the rim of the end face of the honeycomb structure body is 0.8 to 41.0 mm, and the axial length in the extending direction of the cells of the honeycomb structure body is 0.1 to 32.0 mm, and a percentage of a ratio of total area of the missing part on the lateral face of the honeycomb structure body to total area of the lateral face of the honeycomb structure body is 1.40% or less, (Math. 1)

$$\theta_{(n=1,2\ldots N)} = \{(\pi/N) + (2\pi/N) \times (n-1)\}(\pm\theta_{(where\ n=1)}/2) \quad \text{Condition (1):}$$

where R in the polar coordinates $(R, \theta)$ indicates a radial coordinate that represents the radius of the first end face or the second end face that makes up the end-face edge of the honeycomb structure body, $\theta$ in the above polar coordinates $(R, \theta)$ indicates an angular coordinate having, as 0, the intersection on the first end face or the second end face where the rim of the end face intersects a line that is parallel to the grid-like aligned partition wall and passing through the center of the end face, and in the condition (1), N denotes the number of apexes of the polygonal cell, where N=4 to 8, and n denotes a natural number of N or less (n=1, 2 . . . N).

2. The honeycomb structure according to claim 1, wherein the percentage of the ratio of total area of the missing part on the lateral face of the honeycomb structure body to total area of the lateral face of the honeycomb structure body is 0.01 to 1.40%.

3. The honeycomb structure according to claim 1, comprising at least one of the missing part having the radial length on the end face of the honeycomb structure body that is 0.8 to 8.0 mm, the perimeter along the rim of the end face of the honeycomb structure body that is 0.8 to 41.0 mm, and the axial length in the extending direction of the cells of the honeycomb structure body that is 0.1 to 32.0 mm.

4. The honeycomb structure according to claim 1, wherein the partition wall has a thickness of 0.064 to 0.305 mm.

5. The honeycomb structure according to claim 1, wherein the honeycomb structure body has a cell density of 31 to 140 cells/cm$^2$.

6. The honeycomb structure according to claim 1, wherein the honeycomb structure body has an outer diameter of 50.8 to 355.6 mm.

7. The honeycomb structure according to claim 1, wherein the honeycomb structure body has the axial length in the extending direction of each of the cells that is 50.8 to 431.8 mm.

* * * * *